Aug. 29, 1944.  W. L. LEWIS  2,356,860
MOLD FOR HOLLOW BODIES AND METHOD OF CONSTRUCTING THE MOLD
Filed April 14, 1941   3 Sheets-Sheet 1
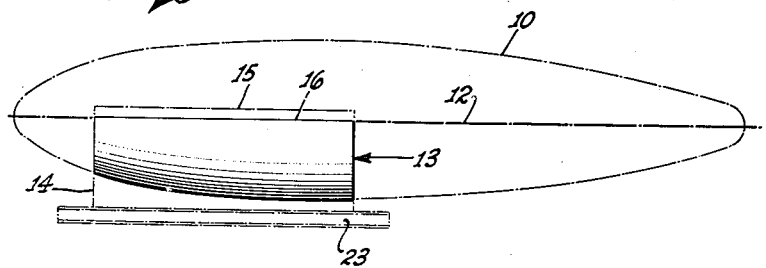
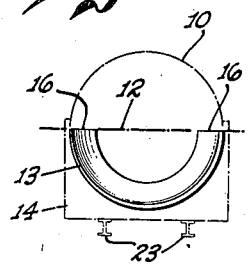
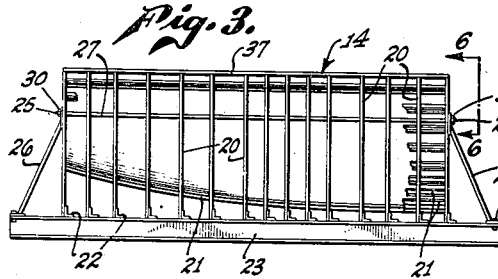
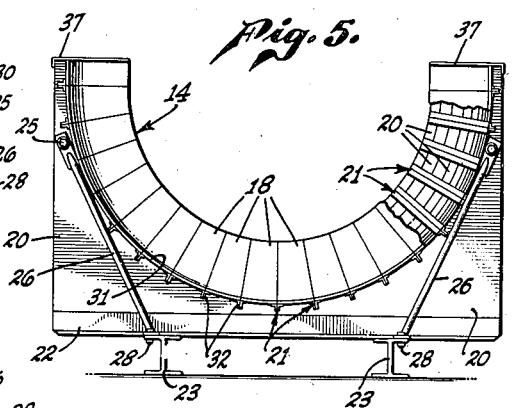
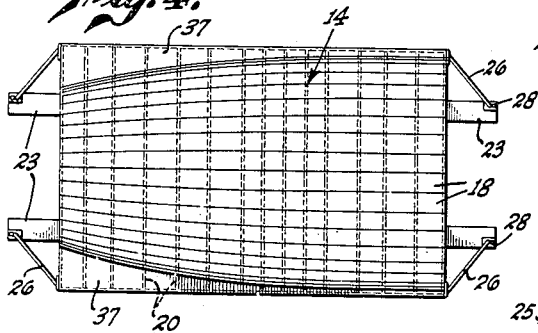
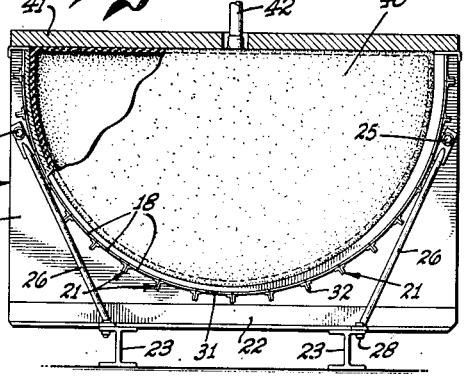
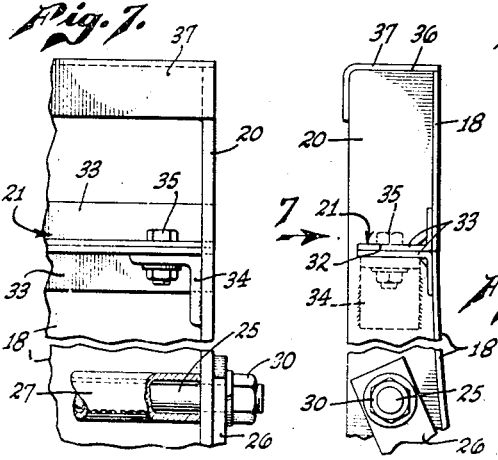
INVENTOR
WILLIAM L. LEWIS
BY
HARRIS, KIECH, FOSTER & HARRIS
ATTORNEYS Aug. 29, 1944. W. L. LEWIS 2,356,860
MOLD FOR HOLLOW BODIES AND METHOD OF CONSTRUCTING THE MOLD
Filed April 14, 1941 3 Sheets-Sheet 2
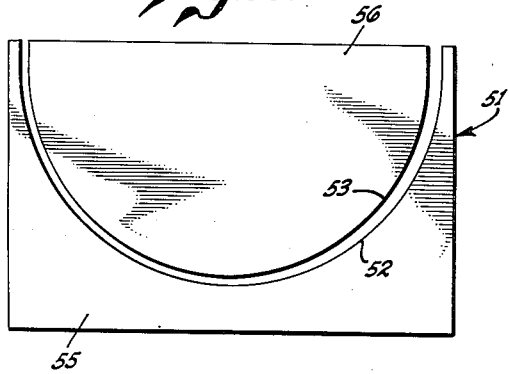
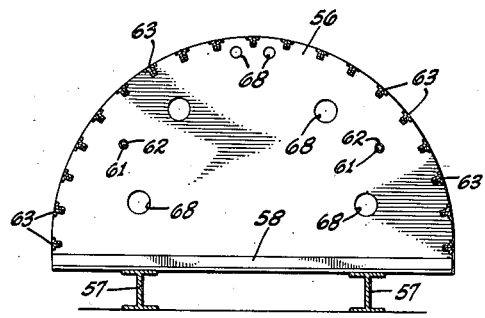
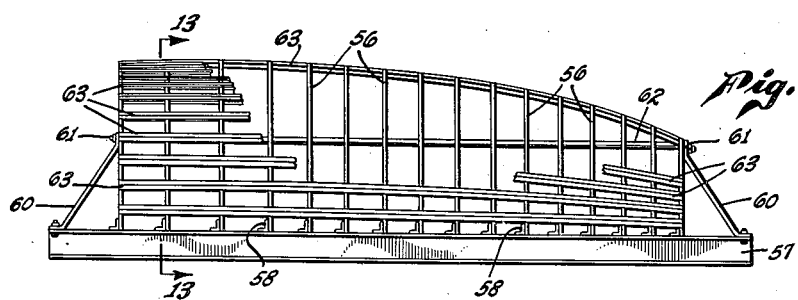
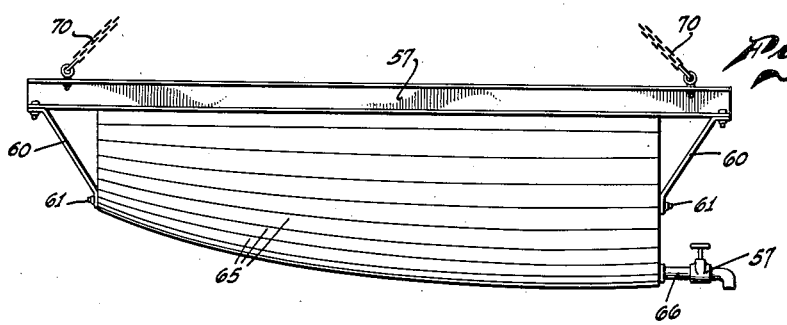
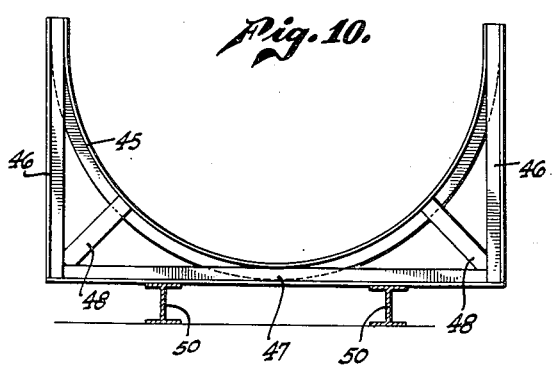
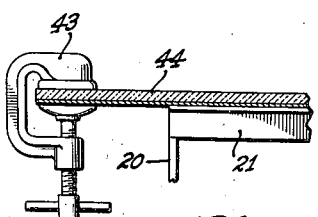
INVENTOR
WILLIAM L. LEWIS
BY
HARRIS, KIECH, FOSTER & HARRIS
FOR THE FIRM
ATTORNEYS

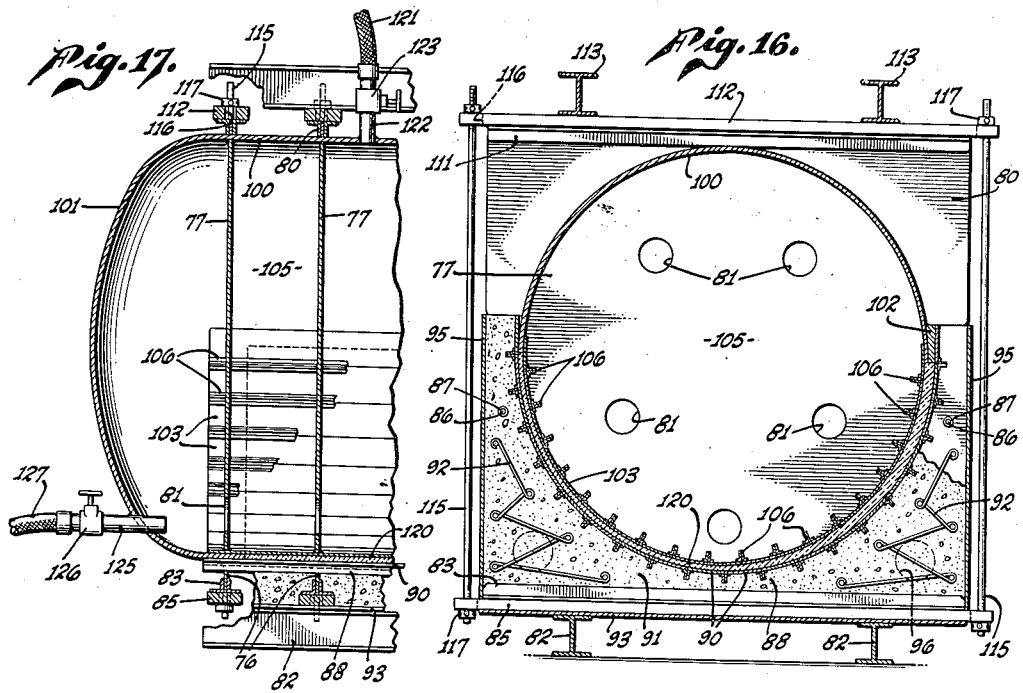
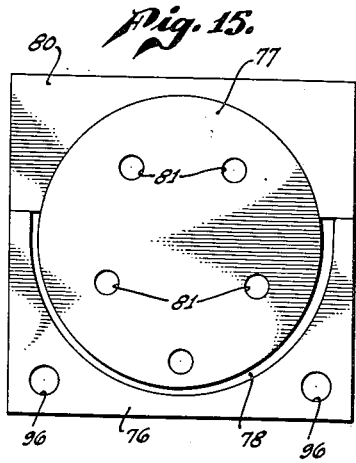
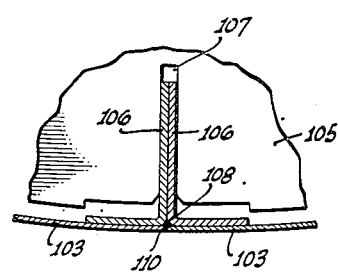
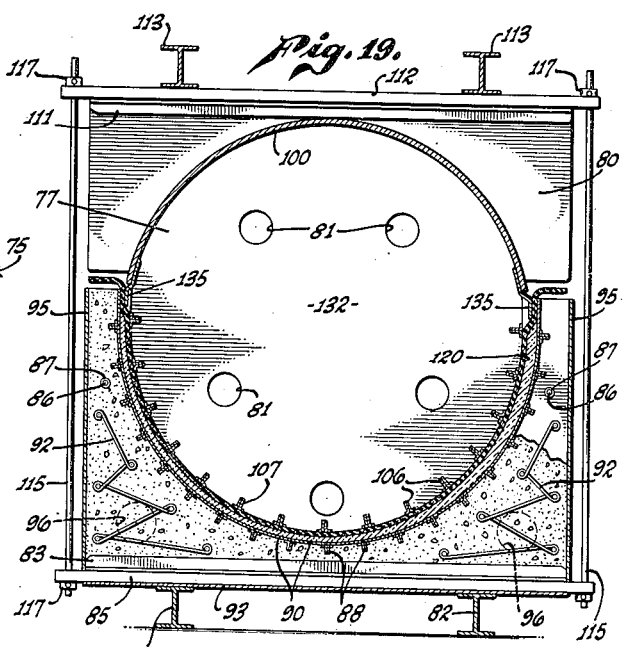

Patented Aug. 29, 1944

2,356,860

UNITED STATES PATENT OFFICE 2,356,860

MOLD FOR HOLLOW BODIES AND METHOD
OF CONSTRUCTING THE MOLD

William L. Lewis, Glendale, Calif., assignor to
Hughes Tool Company, Houston, Tex., a corporation of Delaware Application April 14, 1941, Serial No. 388,410

34 Claims. (Cl. 29—148.2)

My invention relates to molds for forming hollow bodies, with special reference to molds for laminated bodies or bodies fabricated from plastics, and my invention is directed to the finished structure of the mold, to the method of constructing the mold to arrive at a predetermined molding configuration, and to molding methods involving the use of the mold.

The present invention has been initially applied to problems encountered in the molding of large aircraft structures and affords a practical solution for those problems. For the purpose of the present disclosure I elect to describe my invention as specifically applied to the production of an aircraft fuselage, but those skilled in the art will find adequate guidance herein for employing the invention in the production of various hollow bodies in various fields of industry.

The contemplated fuselage is to be molded in diametrically paired sections, and it is desirable that such sections be of substantial length, say, ten to forty feet long. Facts that make the molding problem difficult are: the mold must conform to a body or fuselage section that is not uniform in cross section, both the cross-sectional dimension and the cross-sectional configuration changing along the length of the fuselage; the thickness of the body may vary in accord with the magnitude and distribution of anticipated body stresses, but the exterior of the body must be true to a desired cross-sectional configuration and must be formed with circumferential smoothness; the transition in dimension and configuration from one cross section to another must be gradual to produce a longitudinal profile of smooth flowing lines; the mold must be made of suitable materials and with sufficient strength to withstand without warpage both high molding pressure and high molding temperature. Wood and other light and easily shaped materials cannot meet the physical conditions of the molding procedure.

A male mold may be cast from metal and machined to the required configuration and finish but is not practical, first, because such a mold is excedingly heavy and cumbersome, second, because the labor of machining a mold for a body of non-uniform cross section is excessive, and, third, because it is difficult to wrap such a body with molding material to varying thickness and end up with a finished exterior of the required configuration and especially the required smoothness.

If the cast iron is formed into a hollow mold, the problem of achieving the required exterior for a molded shell of varying thickness presents no difficulties, but the cost of machining the interior of such a hollow casting is prohibitive. The advantages of the hollow type of mold have led to various suggestions for forming such molds from metal plates. Plates that are relatively extensive in both length and breadth have been found to be too unwieldly because the effects of heating or hammering an extensive plate to achieve a desired local configuration cannot be localized. One portion is shaped at the cost of warping adjacent portions. Another suggestion is to employ small plates to be shaped and then assembled, but in practice plates of small dimensions in width and length cannot be readily shaped with acceptable accuracy especially if the plates are of substantial thickness and even with exceptional care such small plates cannot be made to match edge-to-edge with sufficient accuracy to form a smooth molding surface.

A general object of the present invention is to solve the various problems mentioned above and to provide a suitable mold that may be erected inexpensively and may be readily designed accurately for a given configuration. One of the objects of the invention is to provide a procedure for shaping sheeet material to present a molding surface of predetermined configuration. In this regard the invention is characterized by the concept of employing a unitary assembly of transverse and longitudinal supports for the dual purpose of facilitating the shaping of a molding wall and of reinforcing the finished wall to withstand molding pressure. In one practice of the invention a further object is to save labor and to simplify shaping operations by employing relatively thin and easily formed sheet material to achieve a molding surface, the underlying concept being that sheets too thin to withstand normal molding pressure may be formed to the desired molding configuration and then reinforced sufficiently by cast material to withstand the molding pressure.

In the preferred practice of my invention an important object is to provide a method by which a hollow body of non-uniform cross section may be fabricated from stock sheet material, stock plates, and stock bars.

Some of the more specific objects of the invention relate to certain concepts that are applied to the solution of the above-mentioned problems. These concepts will be discussed later. Other objects to be made apparent hereinafter relate to novel methods of applying pressure and heat in molding operations.

In the drawings which are to be taken as illustrative only

Fig. 1 is a plan view of a section from an airplane fuselage, the fuselage as a whole and the mold for making the particular section being indicated in dash-dot lines;

Fig. 2 is a similar view showing the fuselage section in end elevation;

Fig. 3 is a side elevation of the finished mold, certain structural elements being broken away for clarity;

Fig. 4 is a plan view of the mold;

Fig. 5 is an end elevation of the mold on a larger scale;

Fig. 6 is an enlarged fragment taken as indicated by the line 6—6 of Fig. 3;

Fig. 7 is a side elevation of Fig. 6;

Fig. 8 is an end elevation of the mold partly broken away showing the mold in the course of preparation for a molding operation;

Fig. 9 is an enlarged sectional detail showing a clamp holding material on a molding surface;

Fig. 10 is an elevation of an alternative form of cradle that may be employed in the practice of the invention;

Fig. 11 is a plan view of a plate showing cuts made for one practice of the invention;

Fig. 12 is a side elevation of an assembly or internal frame for a convex molding means, some of the longitudinal elements being broken away for clarity;

Fig. 13 is a transverse section taken as indicated by the line 13—13 of Fig. 12;

Fig. 14 is a side elevation of the completed convex molding means in operative disposition;

Fig. 15 is a plan view of a plate as cut into portions for another practice of my invention;

Fig. 16 is a transverse section of a mold comprising a concave molding means and a complementary convex molding means incorporating a pressure chamber;

Fig. 17 is a fragmentary longitudinal section of the molding means shown in Fig. 16;

Fig. 18 is a fragmentary section on an enlarged scale showing a detail of Fig. 16; and Fig. 19 is a transverse section similar to Fig. 16 showing a further modification of the invention.

Fig. 1 shows the configuration in plan of an airplane fuselage 10 that is symmetrical about a longitudinal vertical plane 12 and shows in solid lines a section of the fuselage generally designated by the numeral 13 for which a mold 14 is to be constructed. It is contemplated that the section 13 as initially molded will have its longitudinal edges extended, as indicated by the dot-dash line 15, and will then be trimmed back to provide the longitudinal edges 16 coincident with the longitudinal plane 12. Figs. 1 and 2 show that the diameter of the section 13 is smaller at one end than the other and that the change in cross-sectional dimension is not uniform along the length of the section. Fig. 2 further shows that the thickness of the section wall is not uniform, the thickness being greatest at what will be the floor region of the finished fuselage. Two such sections 13 produced from the same mold may be united edge-to-edge to produce a hollow fuselage section of the length of the mold.

The effective concave molding surface of the mold 14 shown in Figs. 3, 4, and 5 is provided by sheet material preferably in the form of a series of longitudinal sheet metal gores 18, the sheet material being supported by suitable transverse and longitudinal members. In the particular construction shown in Figs. 3 to 8 the transverse supports comprise a plurality of spaced cradles in the form of transverse plates 20 and the longitudinal supports comprise a plurality of ribs or beams 21 extending from plate-to-plate.

The transverse plates or cradles 20 may be held upright in alignment longitudinally of the mold by any suitable structure. In the present arrangement the transverse plates 20 are attached at their lower margins to transverse angles 22 and the transverse angles are mounted on a pair of longitudinal I-beams 23, the I-beams constituting the base of the mold. To make the assemblage rigid, a tie-rod 25 and a pair of diagonal struts 26 may be provided on each side of the mold, the tie-rod extending through the series of transverse plates 20 and carrying tubular spacers 27 between the consecutive plates. The two diagonal struts 26 are attached at their lower ends to one of the I-beams 23 by suitable bolts 28 and at their upper ends are apertured to receive the tie-rod 25, the ends of the tie-rod carrying nuts 30 that engage the ends of the struts and place the series of transverse plates 20 and spacers 27 under compression.

Each of the transverse plates 20 represents a selected station or transverse plane through the fuselage 10, and each of the transverse plates has an arcuate upper edge 31 cut in accordance with the peripheral configuration of the fuselage 10 at the selected station. In cutting away each of the plates 20 to conform with the periphery of the fuselage, allowance is made for whatever thickness of metal in the finished mold overlies the arcuate edge 31. In some practices of my invention the thickness of metal for which allowance is made includes both the thickness of the gores 18 and the thickness of at least parts of the longitudinal ribs 21; in the preferred construction shown in the drawings, however, the transverse plates 20 are provided with slots or recesses 32 in the arcuate edges 31 into which the ribs 21 are sunk flush with the arcuate edge and the added allowance in cutting the arcuate edges 31 is only the thickness of the sheet metal gores.

Preferably each of the longitudinal ribs or beams 21 comprises a pair of angle-irons 33 fastened together back-to-back, as best shown in Fig. 6, to form a unitary T-shaped structural member, and the recesses 32 in the transverse plates are correspondingly T-shaped. Preferably the T-shaped beams 33 are directly attached to at least some of the transverse plates 20, for example by angular clips such as the angular clips 34 shown in Figs. 6 and 7. Each angular clip 34 is welded to the corresponding transverse plate 20 and is attached to the T-shaped beam 21 by a suitable bolt 35. Prior to seating in the recesses 32 the T-shaped beams 21 must, of course, be bent to conform with the longitudinal configuration of the fuselage 10. It is apparent that the assembly of transverse plates 20 constitutes a pattern, jig or work support to indicate what configuration should be given to the longitudinal beams 21, and in practice the mechanic in shaping one of the longitudinal beams concerns himself solely with the requirement of fitting the beam to the transverse plates with minimum bending of the beam, there being no necessity for the mechanic to refer to drawings or a model of the fuselage itself. It will be noted that the transverse plates 20 are spaced relatively close together in the regions where the longitudinal configuration of the fuselage has greater curvature or more abrupt change in direction, greater spacing between the transverse plates being permissible in the regions where substantially no change in direction of the ribs or beams 21 is required.

After the longitudinal beams 21 are installed, the beams together with the transverse plates 20 form a pattern, jig or support assembly for the gores 18 and in practice the dimensions for the gores may be taken directly from the described assembly of transverse and longitudinal members. While each of the gores 18 may be cut in width to overlie more than two of the longitudinal beams 21, I prefer to cut each gore just wide enough to span a pair of the consecutive beams 21 with the intent of having each longitudinal edge of a gore lie along the center line of a beam. If numerous ribs are employed, as indicated in the drawings, the metal selected for the gores 18 may be relatively thin and therefore relatively easy to shape to whatever configuration is determined by the underlying longitudinal ribs 21 together with the underlying arcuate edges 31, the ribs determining the longitudinal curvature of the gores and the arcuate edges determining the transverse curvature of the gores.

Each of the gores may be completely and accurately formed to its final disposition before the gore is assembled to the supporting structure. In practice, however, a gore need be only partially formed before the operation of attaching the gore to the supporting structure is initiated. It is advantageous to progressively form the gore and progressively attach the gore to the supporting assembly as the forming operation is carried out, since that portion of a gore that is anchored to the longitudinal ribs 21 is not distorted to any significant extent by forces employed to form unattached portions of the gore. In other words, the progressive anchoring of the gore to the ribs may be relied upon to progressively render the gore immune from undesirable distortion as the forming operation is carried out. Since the construction permits the use of relatively thin sheet metal for the gores, the gores may be to an important extent formed by the anchoring operation, i. e., the attaching of the gore to the underlying structure may serve to spring the sheet metal of the gore into the desired configuration.

In the described arrangement the gores 18 meet edge-to-edge on the longitudinal beams 21. It is contemplated that the gores will be interconnected to form a unitary molding shell, and such interconnection may be achieved either by welding the gores together or by welding or otherwise attaching the margins of the gores to the longitudinal beams 21. In the latter construction the beams not only serve to interconnect the gores into a unitary shell but also serve to hold the longitudinal edges of contiguous gores in alignment with each other, such alignment being necessary to provide a smooth molding surface. Preferably the uppermost gore 18 extends over the straight or uncut portions 36 of the transverse plates 20 to provide what may be termed deck plates 37 on each side of the finished mold.

The manner in which the mold is employed requires no specific description since the molding procedure is well known in the art and does not constitute a part of the present invention. In brief, the material to be molded into a section of a fuselage is simply laid in the mold to the desired thickness. The material may be plastic material, layers of impregnated fabric or sheets of wood veneer alternating with layers of suitable adhesive. After the material to be molded is arranged in the desired manner, pressure is applied by suitable means. For example, a flexible bag 40 (Fig. 8) may be placed in the mold and a heavy plate 41 fastened across the open top of the mold by suitable means (not shown) and plates (not shown) then installed at the opposite ends of the mold to completely confine the bag 40. Water, air or other fluid under suitable pressure is fed to the bag by a suitable conduit 42. The bag 40 presses the material against the molding surface provided by the series of gores 18, and the molded material becomes a unitary shell suitable for service as one section of the fuselage 10. If the adhesive is thermal-setting it is necessary to apply heat as well as pressure, and one feature of the described arrangement is that the heat may be applied simply by raising the temperature of the fluid in the bag 40.

One problem commonly encountered in employing a device such as above described for a molding operation is that of maintaining molding material on the concave molding surface up to the time the convex molding means is moved into effective molding position. This problem may be solved by extending the sheet material of the concave member, i. e., the gores 18 of the above described construction, beyond the molding zone and employing suitable clamping means to hold the molding material against the extended wall. Fig. 9 shows by way of example how the interconnected gores 18 may extend beyond each of the outermost transverse plates 20 to permit the use of a plurality of clamps 43 outside the molding zone. Fig. 9 shows one of the clamps 43 pressing molding material 44 against the interconnected gores 18, thereby anchoring the molding material for the purpose of the molding procedure.

It will be apparent to those skilled in the art that any suitable type of cradle may be employed instead of the transverse plates 20 in the above described practice of the invention. For example, I may employ cradles constructed as indicated in Fig. 10. In fabricating this alternate form of cradle, the first step is to roll or otherwise form an angle-iron 45 to the cross-sectional configuration of the fuselage at a selected station, the craftsman being guided by a layout of the station on a loft floor. After the angle-iron 45 is shaped to the desired configuration, the angle-iron is incorporated in a frame structure that insures permanence of the predetermined configuration. Thus, in Fig. 10 I show the angle-iron 45 connected to vertical side members 46, transverse bottom members 47, and short diagonals 48 to make a unitary cradle. Such cradles may be mounted on a pair of I-beams 50 and made rigid thereon by suitable interconnections in the manner heretofore described.

The concept of cutting transverse plates to the configuration of a given fuselage may be applied either to the construction of a concave molding means as above described or to the construction of a convex molding means. In one practice of my invention the concept is applied both to a concave molding means and to a complementary convex molding means. Applying the concept to both the concave and convex parts of a fuselage mold not only results in certain important savings in structural material but also simplifies the fabrication procedure and simplifies the problem of properly matching the molding surfaces of the complementary convex and concave molding means.

Fig. 11 shows a rectangular plate 51 cut along an outer curved line 52 and an inner curved line 53, the two lines corresponding to a portion of the wall of the fuselage for which the mold is to be designed. In laying out the lines 52 and 53, allowance is made for the thickness of whatever sheet material is to be used in the mold structure for forming the molding surfaces. The outer curved line 52 severs from the plate 51 a concave-edged plate 55 and the inner curved line 53 severs from the stock plate 51 a convex-edged plate 56. A plurality of rectangular plates 51 is cut in the manner indicated to conform to the configuration of the fuselage at selected stations and the plurality of concave-edged plates 55 may be then assembled into a concave molding means, as heretofore described, with special reference to Figs. 3–6. The manner in which the convex-edged plates 56 are employed to develop a complementary convex molding means is illustrated in Figs. 12, 13, and 14.

Figs. 12 and 13 show a support assembly or internal framework for a convex molding means including a plurality of cradles or transverse members in the form of convex-edged plates 56 attached to the longitudinal I-beams 57 by transverse angle-irons 58. In the manner previously described the transverse plates 56 are held rigidly in their spaced positions by diagonals 60 and tie-rods 61 passing through spacer sleeves 62. The convex edges of the various plates 56 are notched to receive suitable longitudinals or ribs 63 which may be the previously described T-shaped beams formed by united pairs of angle-irons.

To complete the construction of the convex molding means the support assembly or framework shown in Figs. 12 and 13 is covered by suitable sheet material in a suitable manner to present an external convex molding surface. In my preferred construction the sheet material is applied in strips, and I prefer to dispose the strips longitudinally as gores, the widths of the strips corresponding to the spacings of the longitudinals 63. Fig. 14 shows a plurality of such longitudinal gores 65 applied to the support structure and interconnected to form a relatively smooth molding surface. In the construction shown in Fig. 14 the gores are interconnected in a watertight manner and are likewise connected to the outermost of the transverse plates 56 in a watertight manner to form an open top liquid receptacle which may be filled to provide weight for pressure in the molding process. To permit convenient drainage when it is desired to lighten the convex molding means, a discharge pipe 66 and valve 67 may be provided and the intermediate transverse plates 56 may have various apertures 68, as shown in Fig. 13, to permit liquid flow longitudinally toward the discharge pipe 66. Fig. 14 shows the completed convex molding means equipped with chains 70 by means of which it may be connected with a suitable hoist for movement into and out of the complementary concave molding means.

Figs. 15 to 18 exemplify another method of constructing a complementary pair of concave and convex molding means in which the underlying conception is to employ fluid pressure acting against a yielding wall for the purpose of pressing the molding material against an unyielding molding wall. It will be apparent to those skilled in the art that such a pressure chamber and flexible wall may be incorporated in either the concave molding means or the convex molding means. By way of example, I shall describe a construction in which the pressure chamber and yielding means are incorporated in the convex molding means.

In Fig. 15 a heavy rectangular plate 75 is divided by suitable cuts into a concave-edged plate 76, a convex-edged plate 77, an intervening curved piece of scrap 78 and a marginal piece 80 which may be discarded or may be utilized in a manner hereinafter described. The convex edge of the plate 77 is continuous, but a substantial portion of the convex edge is complementary to the concave edge of the plate 76 in the sense that the two edges correspond to the configuration of a given fuselage at a selected station on the fuselage. Suitable apertures 81 are cut in the convex-edged plates 77 to permit fluid flow through the plate in the completed mold.

The concave-edged plates 76 may be assembled into a concave molding means in the manner heretofore described, but for molding operations at relatively high pressures I prefer to construct a concave molding means in the manner indicated by Fig. 16. The various concave-edged plates 76 corresponding to the selected stations of the fuselage are mounted on suitable base members such as a pair of I-beams 82. In the particular construction shown, each of the transverse plates 76 is attached by a pair of transverse angles 83 to an underlying cross bar 85, and the cross bar 85 in turn rests on the I-beams 82. In the previously described manner the concave-edged plates 76 may be braced by tie-rods 86 carrying tubular spacing sleeves 87 and by suitable diagonals (not shown) at the ends of the assembly. The concave edges of the plates 76 are notched to receive longitudinals or ribs 88 which may be in the form of the previously described T-shaped beams. Superimposed on the concave edges of the plates 76 and on the interconnecting ribs 88 is sheet material forming a concave molding wall 90, which molding wall may comprise interconnecting longitudinal gores and may be attached to the concave framework in any suitable manner.

In this particular practice of the invention I contemplate filling in interstices of the concave supporting assembly below the molding wall 90 with a cast body such as a body of concrete 91 embedding suitable reinforcement elements 92. To provide a form for the poured concrete, I may place horizontal plates 93 on the I-beams 82 to fill in the spaces between the cross bars 85 and I may add vertical side plates 95. To permit the concrete body 91 to be continuous from one end of the assembly to the other, I may cut various holes 96 in the plate 76, as indicated in Fig. 15.

One important object of providing the relatively thick body of reinforced concrete is to provide adequate strength for resisting outward pressure against the concave molding wall 90. A further object of importance is to permit the use of relatively thin sheet material for the concave molding wall 90. It is contemplated that relatively thin and readily deformable sheets of insufficient strength to withstand any substantial pressure may be employed for the concave molding wall 90 to simplify the task of shaping the sheet material to the desired configuration, and that the concrete body 91 in intimate contact with the under surface of the concave molding wall will prevent outward flexure and deformation of the thin molding wall under molding pressures.

In the construction of a convex molding means complementary to the described concave molding means in Fig. 16 the various convex-edged plates 77 form cradles or transverse members, these plates being assembled to a relatively heavy shell 100 that is semi-cylindrical in general configuration and that is unitary with dished pressure heads 101 at each end, the combined shell and two heads being shaped and dimensioned to marginally telescope into the concave molding means in the manner indicated in Figs. 16 and 17. Where the molding material is to be relatively thick at the juncture of the shell with the concave molding means the margin of the shell may be increased in thickness by the addition of one or more metal bars 102.

The telescoping margins of the combined shell 100 and dished heads 101 are attached in a fluid-tight manner to the continuous margin of a suitable fluid-tight flexible wall 103 to form a pressure chamber 105. The flexible wall 103 may comprise any suitable sheet material such as rubber sheeting or may be fabricated from longitudinal gores of sheet copper or other metal. Preferably the usual T-shaped longitudinals or ribs 106 comprising united pairs of angle-irons are mounted in complementary notches 107 in the convex edges of the plates 77 to prevent inward collapse of the flexible wall 103. It is contemplated that the flexible wall 103 will be a floating wall in the sense of being free for movement relative to the various transverse plates 77. The wall may likewise be free to move relative to the longitudinal ribs 106. In the construction shown, however, the flexible wall 103 is attached to the various ribs 106, and the ribs are slidingly mounted in the notches of the transverse plates to permit the desired relative movement on the part of the flexible wall. Fig. 18 shows the flexible wall 103 attached to a rib 106 that is free to move in the complementary T-shaped notch 107 in a transverse plate 77. It may be noted in Fig. 18 that one advantage of using united pairs of angle-irons for the longitudinals 106 is that the two angle-irons form a longitudinal groove 108 disposed to receive the ridge 110 of welding material that is formed at the juncture of contiguous gores in the flexible wall 103. The groove permits the flexible wall 103 to lie snugly against the longitudinal.

The transverse plates 77 may serve various purposes. The upper portions of the plates 77 function as reinforcing webs or cradles to strengthen the shell 100 against internal pressure. The lower portions of the plates carry the longitudinal ribs 106 and with the longitudinal ribs maintain the flexible wall 103 in a configuration complementary to the concave molding wall 90 of the underlying concave molding means. A further function on the part of the transverse plates 77 may be to support the whole convex molding means in the concave molding means prior to the application of fluid pressure in the pressure chamber 105.

Since internal fluid pressure exerted against the flexible wall 103 tends to lift the convex molding means out of its normal position for co-operating with the convex molding means, it is necessary to provide some expedient for anchoring the convex molding means against relative movement away from the concave molding means. It is contemplated that such anchorage will be provided by suitable means for releasably connecting the convex molding means directly with the underlying concave molding means.

In the construction shown in Fig. 16 the previously mentioned marginal pieces 80 of the rectangular plate 75 are welded onto the exterior of the shell 100 as lateral wings reinforcing the shell. The top portions of the spaced plates 80 are connected by transverse angles 111 to upper cross bars 112. To the cross bars 112 may be attached a pair of I-beams 113 for engagement by hoist chains for lifting the convex molding means out of the concave molding means when required. The various upper cross bars 112 are paired with the previously mentioned lower cross bars 85 to permit pairs of the cross bars to be releasably interconnected by suitable tension rods 115. In the construction shown, the cross bars 85 and 112 have slots 116 in their ends to receive the tension rods 115, and the tension rods are threaded to receive suitable nuts 117 for engagement with the cross bars.

The manner in which the molding apparatus shown in Figs. 16 and 18 may be employed to form a portion of a fuselage or other hollow body may be readily understood from the foregoing description. With the convex molding means elevated to permit access to the concave molding means, suitable molding material 120 is disposed to desired thickness on the concave molding wall 90 and is temporarily anchored in any suitable manner, for example by the use of the previously described clamps 43. After the molding material 120 is properly disposed, the convex molding means is lowered into cooperative relation with the concave molding means, as indicated in Fig. 16, and the upper and lower cross bars 112 and 85 are interconnected by the tension rods 115. It will be obvious to those skilled in the art that if fluid plastic material instead of sheet material is to be molded in the apparatus, the plastic material will be injected into the space between the concave and convex molding walls after the convex and concave molding means are tied together by the tension rods 115.

The next step is to apply fluid pressure in the pressure chamber 105, for example, by admitting a suitable fluid from a high pressure source. Fig. 17 shows a high pressure hose 121 connected to an inlet pipe 122 at the top of the shell 100 controlled by an inlet valve 123. At the lower part of the pressure chamber in one of the dished heads 101 is an outlet pipe 125 controlled by a valve 126 and connected to a discharge hose 127.

The fluid employed to create the required pressure may be gaseous or liquid and may be hot or cold. In my preferred practice, I contemplate using thermal-setting molding material and employing hot water or steam for the dual purpose of applying pressure to the molding material and of transmitting heat to the molding material. The arrangement shown in Fig. 17 permits fluid circulation through the pressure chamber 105 when it is desirable to continually renew the high pressure fluid for the maintenance of a desired temperature. Responsive to the fluid pressure in the chamber 105 the flexible wall 103 compresses the molding material against the unyielding concave molding wall 90.

Fig. 19 exemplifying a modified practice of the invention shows a molding apparatus that is for the most part identical with the construction shown in Fig. 16, corresponding numerals being employed for corresponding elements. The construction differs from Fig. 16 essentially in the employment of a loose flexible wall 130 instead of the previously described flexible wall 103. The loose flexible wall 130 may be, for example, a detached rubber blanket of suitable pattern to extend smoothly over the molding material in the concave molding means. If such a loose flexible wall is employed, the longitudinal ribs 106 may be anchored to the transverse plates 77 in the convex molding means.

In operating the apparatus shown in Fig. 19, the unyielding concave molding wall 90 is lined with suitable molding material 120, the loose flexible wall 130 is disposed over the molding material, and the combined shell 100 and dished heads 101 are lowered into marginal engagement with the loose flexible wall, thereby defining with the loose flexible wall a pressure chamber 132. Water which may be hot or cold is then introduced under pressure into the pressure chamber 132 to force the loose flexible wall 130 radially outward against the molding material 120. In employing this particular apparatus the juncture of the upper molding means with the lower molding means should be substantially liquid-tight and it may be desirable to employ some suitable sealing means known in the art. For example, strips 135 of suitable resilient material may be mounted on the inner margins of the shell 100 and the dished heads 101 to overlie adjacent portions of the loose flexible wall 130, it being contemplated that fluid pressure in the chamber 132 will press the strips 135 into sealing engagement with the loose flexible wall 130.

In the light of my disclosure, I stress the concepts: that thin readily deformable sheets may be employed to provide a desired molding configuration if reinforced at spaced points to maintain the molding configuration under pressure; that the employment of relatively narrow strips of the thin material facilitates shaping to the desired configuration; that shaping is facilitated if the strips are in the form of longitudinal gores of liberal dimension in the direction of lesser bending curvature and restricted dimension in the direction of greater bending curvature; that sufficiently closely spaced cradles conforming to the girth curvature of the desired molded body may serve as guides and even as forming anvils for the transverse bending of the sheet material; that progressively attaching a gore to a rigid longitudinal reinforcement member as the shaping of the gore progresses has the advantage of preventing the forming operation from adversely affecting parts of the gore already formed; that longitudinal ribs bent to conform to the spaced cradles will form smooth curves closely following the desired body configuration, the assembly of cradles serving as a bending pattern for the longitudinal ribs; that the selected stations for the cradles may be spaced relatively far apart in regions of uniform change in configuration of the molded body; that an accurate molding frame may be constructed by using tranverse plates having edges cut to the cross-sectional configuration of the molded body at selected stations; that cradles for a concave molding means and webs for a complementary convex molding means may be cut from the same rectangular plates to facilitate accurately matching the two molding means; that an assembly of webs and sheet material comprising a convex molding means may be adapted to serve as a liquid receptacle to provide weight and pressure and to provide heat for the molding material; that in a molding apparatus of the character described a fluid pressure chamber with a flexible wall may be employed for applying the molding pressure; that such a flexible wall may be floatingly mounted on a supporting framework; that a completely detached flexible wall may be employed to form part of a pressure chamber; and that liquid employed for providing weight and pressure may be heated and circulated as a source of heat for the molding process.

The preferred practices of my invention set forth herein will suggest to those skilled in the art various changes and substitutions under my broad concepts; and I specifically reserve the right to all such departures from the disclosure that properly come within the scope of my appended claims.

I claim as my invention:

1. A method of constructing a mold for a portion of a large hollow body of non-uniform cross section for aircraft and the like, characterized by the use of sheet material formed of metal and a plurality of rigid metal plates, said method including the steps of: cutting each of said plates to produce a cut edge conforming to the desired cross-sectional configuration of said body at one of a plurality of stations therealong; aligning said plates fixedly at positions spaced to correspond to said stations and in such manner that said cut edges conform substantially to the desired surface configuration of the hollow body; placing said sheet material across the cut edges of said plates; and shaping the sheet material to conform with the configurations of the individual cut edges and to conform with the over-all longitudinal configuration defined collectively by the cut edges and while progressively securing said sheet material adjacent the cut edges as the sheet material is shaped, thereby forming a molding surface.

2. A method of constructing a mold for a portion of a large hollow body of non-uniform cross section for aircraft and the like, characterized by the use of sheet material formed of metal and a plurality of rigid metal plates, said method including the steps of: cutting each of said plates to produce a cut edge conforming to the desired cross-sectional configuration of said body at one of a plurality of stations therealong; aligning said plates fixedly at positions spaced to correspond to said stations and in such manner that said cut edges conform substantially to the desired surface configuration of the hollow body; cutting said sheet material into a plurality of longitudinal gores; placing said gores across the cut edges of said plates and shaping same to conform with the configuration of the cut edges and with the over-all longitudinal configuration defined collectively by the cut edges, said gores being placed across said cut edges in sequence and in edge-to-edge relationship; and interconnecting the edges of said gores to form a unitary molding surface.

3. A method of constructing a mold for a portion of a hollow body of non-uniform cross section for aircraft and the like, characterized by the use of sheet material formed of metal and a plurality of rigid metal plates, said method including the steps of: cutting each of said plates according to the cross-sectional configuration of said body at one of a plurality of stations to produce a plurality of concave-edged plates and a corresponding plurality of convex-edged plates; aligning said concave-edged plates fixedly at positions spaced to correspond to said stations; placing some of said sheet material across the aligned concave edges of said plates and shaping the sheet material to conform with the configurations of the individual concave edges and to conform with the over-all longitudinal configuration defined by the concave edges collectively thereby forming a concave molding assembly with a concave molding surface; aligning said convex-edged plates fixedly at positions spaced to correspond to said stations; and, placing some of said sheet material across the aligned convex edges of said convex-edged plates and shaping the sheet material to conform with the configurations of the individual convex edges and to conform with the over-all longitudinal configuration defined by the convex edges collectively thereby forming a convex molding assembly with a convex molding surface complementary to said concave molding surface.

4. A method of constructing a mold for a portion of a hollow body of non-uniform cross section for aircraft and the like characterized by the use of sheet material formed of metal and a plurality of rigid metal plates, said method including the steps of: cutting each of said plates according to the cross-sectional configuration of said body at one of a plurality of stations to produce a plurality of concave-edged plates and a plurality of convex-edged plates; aligning said concaved-edged plates fixedly at positions spaced to correspond to said stations; placing some of said sheet material across the aligned concave edges of said plates and shaping the sheet material to conform with the configurations of the individual concave edges and to conform with the over-all longitudinal configuration defined by the concave edges collectively thereby forming a concave molding assembly with a concave molding surface; aligning said convex-edged plates fixedly at positions spaced to correspond to said stations; placing some of said sheet material across the aligned convex edges of said convex-edged plates and shaping the sheet material to conform with the configurations of the individual convex edges and to conform with the over-all longitudinal configuraiton defined by the convex edges collectively thereby forming a convex molding assembly with a convex molding surface complementary to said concave molding surface; and covering one of said molding assemblies to form a pressure chamber defined in part by the sheet material thereon whereby fluid pressure may be employed to force one of said molding surfaces toward the other molding surface.

5. A method of constructing a mold for a portion of a large hollow body of non-uniform cross section for aircraft and the like, characterized by the use of sheet material formed of metal, a plurality of rigid metal plates, and a plurality of elongated metal members, said method including the steps of: cutting each of said plates to produce a cut edge conforming to the desired cross-sectional configuration of said body at one of a plurality of stations therealong; aligning said plates fixedly at positions spaced to correspond to said stations and in such manner that said cut edges conform substantially to the desired surface configuration of the hollow body; notching said cut edges of said plates at peripherally spaced positions; bending said elongated members to longitudinal curves determined by the configuration of the collective cut edges of said plates; placing said elongated members in the notches of said plates to extend between the cut edges of said plates in laterally spaced relationship with each other to form an interstitial framework; and placing said sheet material across the cut edges of said plates in bridging relationship with respect to adjacent elongated members and progressively shaping the sheet material to conform with the configurations of the individual cut edges of the plates and to conform with the longitudinal curves of said elongated members while progressively attaching said sheet material to said interstitial framework, thereby forming a molding surface.

6. A method of constructing a mold for a portion of a large hollow body of non-uniform cross section for aircraft and the like, characterized by the use of sheet material formed of metal, a plurality of rigid metal plates, and a plurality of elongated metal members, said method including the steps of: cutting each of said plates to produce a cut edge conforming to the desired cross-sectional configuration of said body at one of a plurality of stations therealong; aligning said plates fixedly at positions spaced to correspond to said stations and in such manner that said cut edges conform substantially to the desired surface configuration of the hollow body; bending said elongated members to longitudinal curves determined by the configuration of the collective cut edges of said plates; placing said elongated members in laterally spaced relation along the cut edges of the plates; cutting said sheet material into a plurality of longitudinal gores corresponding in width to the spacing of said elongated members; placing said gores across the cut edges of said plates with the margins of said gores resting on said elongated members and shaping the gores to conform with the configurations of the individual cut edges of the plates and to conform with the longitudinal curvature of said elongated members; and interconnecting said gores to form a molding surface.

7. A method as defined in claim 6, in which said gores are interconnected by welding said margins thereof together and to said elongated members.

8. A mold of the character described for producing a hollow member of non-uniform cross section for aircraft and the like, said mold comprising: a plurality of transverse cradles spaced to correspond to selected stations on the desired hollow member and shaped to conform to the cross-sectional configuration of the hollow member at the corresponding stations; a plurality of longitudinal sheet metal gores of relatively narrow width disposed on said cradles, said gores being bent transversely to conform to the periphery of the desired member and being bent longitudinally to extend in smooth lines from cradle to cradle; and longitudinal reinforcement means extending from cradle to cradle and underlying contiguous margins of said gores.

9. A mold of the character described for producing a hollow member of non-uniform cross section for aircraft and the like, said mold comprising: a plurality of transverse cradles spaced to correspond to selected stations on the desired hollow member and shaped to conform to the cross-sectional configuration of the hollow member at the corresponding stations; a plurality of longitudinal sheet metal gores of relatively narrow width disposed on said cradles, said gores being bent transversely to conform to the periphery of the desired member and being bent longitudinally to extend in smooth lines from cradle to cradle; and a reinforcement casting forming a thick unyielding wall extending from cradle to cradle against the lower surfaces of said gores to resist deformation and flexure of the gores under pressure.

10. A mold of the character described for producing a hollow member of non-uniform cross section for aircraft and the like, said mold comprising: a plurality of transverse plates spaced to correspond to selected stations on the desired member, said plates having edges cut to conform to the cross-sectional configuration of the member at the corresponding stations with allowance for thickness of metal in the structure of the mold, each of said plates having a plurality of spaced recesses in said cut edges; a plurality of spaced longitudinal beams resting in said recesses, said beams being shaped longitudinally to extend in smooth lines from cut edge to cut edge of said plates thereby to conform to the longitudinal profile of the desired member; and a plurality of sheet metal strips resting on said cut edges and said beams, said strips being shaped to conform with said beams and being shaped to conform with the cut configuration of said plates thereby conforming longitudinally and laterally with the surface of the desired member, said strips being interconnected to form a unitary mold-shell.

11. A mold of the character described for producing a hollow member of non-uniform cross section for aircraft and the like, said mold comprising: a plurality of transverse plates spaced to correspond to selected stations on the desired member, said plates having edges cut to conform to the cross-sectional configuration of the member at the corresponding stations with allowance for thickness of metal in the structure of the mold, each of said plates having a plurality of spaced recesses in said cut edges; a plurality of spaced longitudinal beams resting in said recesses, said beams being shaped longitudinally to extend in smooth lines from cut edge to cut edge of said plates thereby to conform to the longitudinal profile of the desired member; and a plurality of longitudinal sheet metal gores resting on said cut edges and said beams, said gores being shaped to conform with said beams and being shaped to conform with the cut configuration of said transverse plates thereby conforming longitudinally and laterally with the surfaces of the desired member, said gores being interconnected to form a unitary mold-shell.

12. A mold of the character described for forming a hollow member of non-uniform cross section for aircraft and the like, said mold comprising: a unitary assembly of intersecting transverse and longitudinal supports of curved configurations corresponding to the circumferential and longitudinal configuration of said hollow member; and relatively thin strips lining said assembly in edge-to-edge relationship to form a molding surface.

13. A mold of the character described for forming a hollow member of non-uniform cross section for aircraft and the like, said mold comprising: a unitary assembly of intersecting transverse and longitudinal supports of curved configurations corresponding to the circumferential and longitudinal configuration of said hollow member; relatively thin strips lining said assembly in edge-to-edge relationship; and a body occupying interstices of said assembly and at least partially embedding at least some of said supports and lying against said relatively thin strips to prevent yielding of said strips toward said assembly.

14. A mold of the character described for forming a hollow member of non-uniform cross section for aircraft and the like, comprising: a unitary assembly of intersecting transverse and longitudinal supports of curved configurations corresponding to the circumferential and longitudinal configuration of said hollow member; sheet material mounted on said assembly to form a molding wall; a complementary unitary assembly; and sheet material mounted on said complementary assembly to provide a complementary molding wall, the molding wall on one of said assemblies extending beyond the edges of the other molding wall to permit the clamping of molding material to said wall of the one assembly outside said wall of the other molding assembly.

15. A method as set forth in claim 2 in which said sheet material is cut into longitudinal gores that vary in width in accord with variations in cross-sectional dimension of the non-uniform body that is to be molded.

16. A method as set forth in claim 5 in which said elongated members are positioned to converge and diverge in accord with variations in the cross-sectional dimension of the body to be molded.

17. A method as set forth in claim 6 in which said elongated members are positioned to converge and diverge in accord with variations in the cross-sectional dimension of the body to be molded.

18. A method of constructing a mold for an extensive portion of a relatively hollow body of non-uniform cross section for aircraft and the like, including the steps of: forming numerous metal templets conforming to the cross-sectional configuration of said body at each of numerous stations; aligning said templets fixedly at positions spaced to correspond to said stations; and placing sheet metal across the edges of said templets and shaping the sheet metal to conform with the edges of the individual templets and to conform with the overall longitudinal configuration defined by the templet edges collectively, thereby forming a molding surface.

19. A method as defined in claim 18, including the step of cutting said sheet metal into a plurality of longitudinal gores before placing same across the edges of said templets and before said shaping of the sheet metal, said gores being placed across the edges of said templets in edge-to-edge relationship, and including the step of welding the edges of said gores together to form a unitary molding surface.

20. A mold of the character described for producing a hollow member of non-uniform cross section for aircraft and the like, said mold comprising: a plurality of transverse members spaced to correspond to selected stations on the desired hollow member and shaped to conform to the cross-sectional configuration of the hollow member at the corresponding stations; a plurality of longitudinal sheet metal gores of relatively narrow width disposed on said transverse members, said gores being bent transversely to conform to the periphery of the desired member and being bent longitudinally to extend in smooth lines from transverse member to transverse member, said gores being interconnected to form a continuous flexible sheet; a plurality of longitudinal reinforcement means extending from transverse member to transverse member to back up said flexible sheet; and wall means co-operating with said sheet to form a chamber to contain fluid under pressure to press said flexible sheet against material for said hollow member.

21. A mold of the character described as set forth in claim 20 in which said flexible sheet is connected with said plurality of reinforcement means and in which said reinforcement means are floatingly mounted on said transverse members for lateral movement relative to the cradles.

22. A mold of the character described for forming a hollow member of non-uniform cross section for aircraft and the like, said mold comprising: a unitary assembly of intersecting transverse and longitudinal supports of curved configurations corresponding to the circumferential and longitudinal configuration of said hollow member; relatively thin strips lining said assembly in edge-to-edge relationship to form a molding surface, said strips being interconnected to form a continuous flexible sheet; and wall means cooperative with said sheet to form a chamber to contain fluid under pressure to press said flexible sheet against material for said hollow member.

23. A mold as defined in claim 11, in which at least some of said recesses movably retain the longitudinal beams extending therein in a manner to permit movement thereof with respect to said transverse plates.

24. A mold as defined in claim 11, in which said gores are interconnected and attached to said longitudinal beams, and in which at least some of said recesses movably retain the longitudinal beams extending therein in a manner to permit movement of said longitudinal beams and said unitary mold-shell with respect to said transverse plates.

25. A mold of the character described for forming a large hollow member of non-uniform cross section for aircraft and the like, said mold comprising: a unitary assembly of intersecting transverse and longitudinal supports of curved configurations corresponding to the circumferential and longitudinal configurations of said hollow member, said transverse supports of said unitary assembly comprising a plurality of transverse members spaced from each other to correspond to selected stations along the desired hollow member and providing curved surfaces conforming to the circumferential configuration of the hollow member at the corresponding stations, said longitudinal supports of said unitary assembly comprising spaced longitudinal beams extending in smooth lines from transverse member to transverse member substantially flush with said curved surfaces and shaped to conform to the longitudinal configuration of the desired hollow member; and relatively thin strips lining said assembly in edge-to-edge relationship to form a molding surface.

26. A mold as defined in claim 25, in which said relatively thin strips comprise gores meeting edge to edge at positions along said longitudinal beams.

27. A mold as defined in claim 25, in which said relatively thin strips comprise gores formed of metal and meeting edge to edge at positions along said longitudinal beams, and in which the adjacent edges of said gores are welded together.

28. A mold as defined in claim 25, in which said relatively thin strips comprise gores formed of metal and meeting edge to edge at positions along said longitudinal beams, and in which the adjacent edges of said gores are welded together and to the contiguous longitudinal beam.

29. A mold as defined in claim 25, in which said curved surfaces of said transverse members include notches to receive said longitudinal beams, and in which each of said longitudinal beams is of a sufficient length to traverse a large number of said transverse members.

30. A mold as defined in claim 25, in which said longitudinal beams have a pair of angularly disposed flanges, and in which said curved surfaces of said transverse members are notched to receive said flanges and so that one of said flanges of each beam lies substantitally flush with the adjacent curved surface, said thin strips comprising metal gores meeting edge to edge adjacent the flush flanges of said longitudinal beams, the edges of said gores being welded together and to such flush flanges.

31. A mold as defined in claim 25, in which said transverse members comprise transverse plates, and including means for spacing said plates from each other to correspond to said selected stations along the desired hollow member, said spacing means including a rod means extending through a plurality of said transverse plates, a plurality of spacers extending longitudinally between said transverse plates and means for compressing together the transverse plates and spacers between the ends of said rod means.

32. A mold as defined in claim 25, including strong supporting frames on one side of said unitary assembly and means for connecting each of said transverse members to said supporting frames.

33. A mold as defined in claim 25, including walls spaced from said thin strips to provide a space into which said longitudinal beams extend, said space being filled with a cast material to embed and further support the longitudinal beams extending in said space, said cast material extending in surface contact with said relatively thin strips to reinforce same between said longitudinal beams against movement due to pressure applied to said molding surface.

34. A mold as defined in claim 25, in which said curved surfaces and said molding surface are concave upwardly to conform to the outer surface of said hollow member, and including a convex-surfaced unitary assembly of intersecting transverse and longitudinal supports of curved configurations corresponding to the desired inner circumferential and longitudinal configuration of said hollow member and a relatively thin covering material covering the intersecting transverse and longitudinal supports of said last-named unitary assembly and conforming to said desired internal circumferential and longitudinal configuration of said hollow member to provide a convex molding surface spaced from said concave molding surface a distance corresponding to the desired thickness of said hollow member, wall means associated with said last-named unitary assembly for defining a chamber bounded at its lower end by said thin covering material, and including means for delivering a liquid weighting material to this chamber to press said concave molding surface against any material between said concave and convex molding surfaces.

WILLIAM L. LEWIS.